United States Patent [19]

Schinker et al.

[11] Patent Number: 5,028,251
[45] Date of Patent: Jul. 2, 1991

[54] MOLDS FOR MANUFACTURING MOLDED GLASS-ARTICLES FOR PRECISION-OPTICAL PURPOSES

[75] Inventors: Martin Schinker, Merzhausen; Johannes Brormann, Bötzingen; Dieter Stahn, Stegen; Walter Döll, Reute; Günter Kleer, Buchenbach; Peter Manns, Freiburg, all of Fed. Rep. of Germany

[73] Assignee: Schott Glaswerke, Mainz, Fed. Rep. of Germany

[21] Appl. No.: 476,204

[22] Filed: Feb. 7, 1990

Related U.S. Application Data

[63] Continuation of Ser. No. 239,471, Sep. 1, 1988, Pat. No. 4,921,519.

[30] Foreign Application Priority Data

Sep. 2, 1987 [DE] Fed. Rep. of Germany ....... 3729281

[51] Int. Cl.$^5$ ............................................. C03B 11/06
[52] U.S. Cl. .................................... 65/374.13; 65/39; 65/374.11; 249/134; 427/133; 427/135
[58] Field of Search ................. 65/39, 32.1, 32.5, 66, 65/77, 374.11, 374.13; 249/134; 427/135, 133

[56] References Cited

U.S. PATENT DOCUMENTS 4,606,750 8/1986 Torii et al. .................... 65/374.13
4,747,864 5/1988 Hagerty et al. .............. 65/374.13 X

OTHER PUBLICATIONS

DIN 3140, Deutsche Normen Tell 1, Oct. 1978, 0212-38, 81.
"Measurements and effects of surface defects and quality of polished SPIE", vol. 525, pp. 64-69 (1985), Lionel R. Baker et al.

Primary Examiner—Robert L. Lindsay
Attorney, Agent, or Firm—Millen, White & Zelano

[57] ABSTRACT

For manufacturing a glass article for precision-optical purposes, a preform is provided which is unwrought relating to the desired shape of the glass article to be manufactured and exhibits within the surface areas serving for the formation of optical effective planes a high surface quality. The preform is pressed at a sufficiently high temperature in a mold, the function layers of which, serving for the formation of the optical suitable planes are hard and wear resistant, optionally containing hard nitrides and/or carbides, being mechanically unwrought structureless thin layers coated by cathode sputtering, for example, on a working surface of the basis of the mold. At the beginning of the pressing process, the preform and at least one of the function layers of the mold exhibit a difference in temperature amounting at least to 30 K, but less than a value where inhomogeneities in and/or surface defects on the glass molding may be produced.

24 Claims, 1 Drawing Sheet

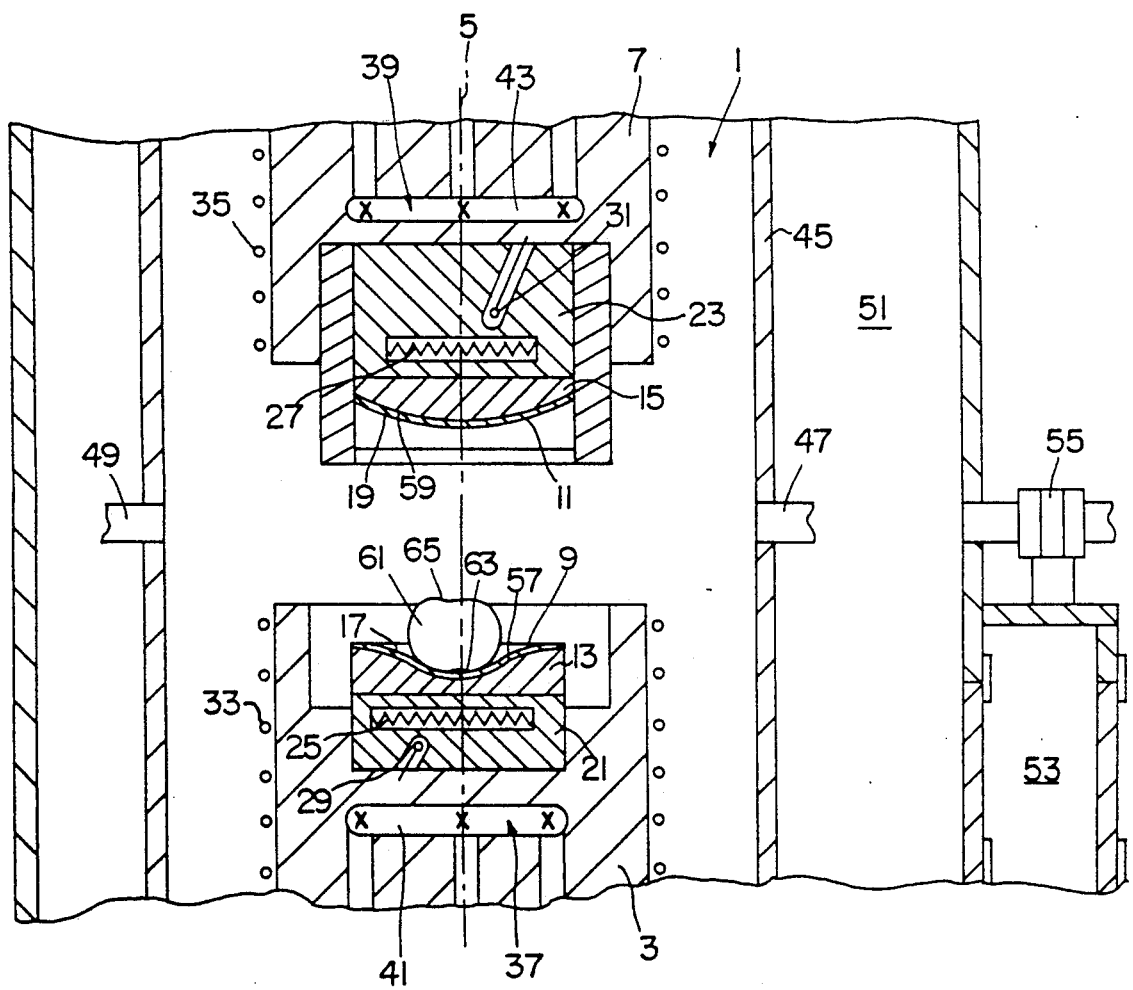

MOLDS FOR MANUFACTURING MOLDED GLASS-ARTICLES FOR PRECISION-OPTICAL PURPOSES

This is a continuation of application Ser. No. 07/239,471 filed Sept. 1, 1988 now U.S. Pat. No. 4,921,519 granted May 1, 1990.

FIELD OF THE INVENTION

The invention relates to a method for manufacturing a glass article for precision-optical, especially image-forming purposes. In this method, a preform is produced having generally different geometric shape compared to the desired shape of the glass article to be manufactured, but which has at least within the surfaces serving for the formation of optical suitable planes, a high surface quality at least approximately corresponding to a fire-polish.

The preform is pressed in an atmosphere of protective gas or under vacuum at a sufficiently high temperature in a mold to provide the desired shape. The function planes of the mold serving for the formation of the optically effective planes are designed as hard, wear resistant and plain function (working) layers. These function layers can contain hard nitrides and/or carbides and exhibit a surface shape and a surface quality suitable for the generation of the optically suitable planes. The resultant glass article is cooled within the mold until a sufficiently stable form is obtained, then it is removed from the mold and annealed. (By "function or working layer" is meant the layer that is in contact with the glass.)

BACKGROUND OF THE INVENTION

A method, discussed in DE-OS 26 39 259, employs function planes of the mold which are brought to a desired surface quality mechanically by grinding or polishing. (A function plane is the outer plane of the function layer in contact with the glass.) The function planes must therefore be obtained from function layers which are thick enough for mechanical treatment as well as thick enough to avoid unacceptable deformation during the pressing step.

The manufacture and the removal treatment of such comparatively hard function layers is very expensive. Also, it is difficult to reproducibly form glass articles of high surface quality using this method.

According to the known method, the pressing is isothermal, i.e., the preform and the part of the press interacting with the preform are brought to about the same temperature. In a final state of the pressing, the temperature of the mold and the preform being held under compressive load within the mold is lowered gradually in such a way that the temperatures of the mold and the preform remain approximately equal during the cooling process.

The isothermal pressing is considered to be advantageous because thermal stresses located in the glass-areas lying near the mold which result in micro shifting between the glass surface and the surface of the mold, possibly leading to surface defects of the preform, are avoided. Using similar reasoning, isothermal pressing is also used in other methods, e.g., according to EP 19 342 in the temperature range of the American softening point ($10^{7.6}$ dPa.s) or EP 78 658, in which pressing is carried out at comparatively high viscosities.

On the other hand, other methods for the pressing of glass articles for optical purposes are also known, employing conventional pressing of a sufficiently heated preform between function layers of the mold which are at lower temperatures (DE-PS 397 427). Conversely, no definite relation between the temperatures of the preform and the function layers of the mold is discussed. The pressed glass articles manufactured this way, especially lenses, are not suitable for image-forming purposes and are used, e.g., for condensers.

The pressing of glass articles for image-forming purposes is the object of the newer methods and the evolution of the art has shown that in these pressing methods definite temperatures should be preserved. In the previously discussed EP 78 658, a method is described wherein the pressing process takes place at such a high viscosity of the glass, i.e., at such lower temperatures, that the preform can only be deformed minimally during acceptable pressing times. Therefore, the preform has to have a shape corresponding closely to that desired for the final product. This requirement of providing precisely prepared preforms is an additional step in the process. Furthermore, low pressing temperatures require long pressing times and high pressing forces so that overall the method leaves much room for improvement from the standpoint of process economics and product quality assurance.

SUMMARY OF THE INVENTION

It is an object of the present invention to provide a method for manufacturing molded glass articles of high optical quality suitable for image-forming purposes, coupled high production speed and product reliability.

Another object is to provide an improved mold.

Upon further study of the specification and appended claims, further objects and advantages of this invention will become apparent to those skilled in the art.

To attain these objects, a method is provided wherein a mold is used, the function layer of which is a mechanically unwrought structureless thin-layer, (e.g., non-structured layer which may have a crystallographic structure) having a thickness of generally less than 5 um (microns) and preferably in the range of 0.2 to 0.8 um, and a peak-to-valley height of generally less than 0.1 um. (By "mechanically unwrought" is meant essentially, preferably completely, free of mechanical treatment such as, for example, grinding.) The function layer is strongly adhered to a basis having a form which corresponds to the desired final form of the finished product taking into account thermal deformation. The function layer has a surface precision and quality suitable for the formation of optically effective planes.

The material of the basis is amorphous, monocrystalline or polycrystalline having a grain size of generally less than 0.5 um.

At the beginning of the pressing process, the preform and at least one of the function layers of the mold have a difference in temperature amounting at least to 30° K., however, with an upper limit lying below a value where inhomogeneities in and/or surface defects on the glass preform may be suspected. The preferred temperature difference is generally in the range of 30° to 150°, especially 50° to 90° K.

According to the invention, a mold is used having a hard function layer, which is mechanically unwrought and has a high-grade surface quality of a structureless applied layer. Since this function layer is very thin and is formed by conventional methods and has essentially a uniform layer thickness, no detrimental defect or design is caused by the function layer even if there is no mechanical finishing of the layer.

The precision of design is ensured by a corresponding mechanical treatment of the molding surface of the basis (i.e., the surface layer of the basis prior to coating with the function layer).

This mechanical treatment should also largely correspond to the surface quality necessary for the preform to be manufactured. The function layer overlying the basis is as thin as possible while allowing its outer surface to exhibit a faithful reproduction of the underlying molding surface of the basis; however, a smoothing of the microscopically small surface defects of the surface of the basis occurs (such microscopically small defects possibly remaining after mechanical treatment), so that the free surface of the function layer has even a better surface quality than the underlying molding surface of the basis.

Thin layers are sensitive to cyclic operating pressing and peeling forces. This is also true for very thin layers of materials normally tending to have little adhesion to glass. To alleviate the possibility of such detriments in accordance with the invention, the use of a difference in temperature between the preform and the mold is provided. This difference in temperature is determined in such a way that the peeling of the formed glass article from the function planes of the mold is favored. On the other hand, the difference in temperature is not so great so as to involve any danger of undesired inhomogeneities in the preform. This controlled nonisothermal procedure was shown to contribute effectively to avoid an undesired adhesion between the preform and the function planes.

The function layer can be applied by known methods for manufacturing non-structured thin-layers, e.g., epitactically or amorphous, by reactive DC-sputtering or by radio frequency sputtering. Such known methods are described, for example, in L. J. Maissel and R. Glang: Handbook of The Film Technology, McGraw-Hill, 1983 Reissue (Edition).

In an embodiment of the invention, a mold is provided having a basis formed by material containing at least one of the elements Ti, Zr, Hf, V, Nb, Ta, Cr, Mo, W, Al, Si, Ge, C, whereby at least one of these elements can exist as a compound with nitrogen or oxygen. The function layer contains a compound of carbon and/or nitrogen and at least one of the elements present in the basis.

It was shown that in this way, i.e., by providing at least one of the same elements in the basis and in the function layer, a much better adhesion of the very thin function layer to the basis can be guaranteed.

Typical compositions of the function layer and basic layer include but are not limited to:

| Function Layer | Basic Layer |
| --- | --- |
| AlN | $Si_3N_4$ |
| AlN | Si |
| $Si_3N_4$ | $SiO_2$ |
| TiAlZrN | $Al_2O_3$ |
| $(Ti_xAl_yZr_z)N$ | $ZrO_2$ | where
$0.4 \leq x \leq 0.8$
$Y = 1 - x - z$
$0.1 < z < 0.01$

For the deposition of the function layers targets containing the components in certain ratios may be used, e.g. targets containing aluminum, titanium and zirconium where the aluminum to titanium to zirconium ratio amounts to, e.g., 0.5:0.48:0.02. The use of targets containing, e.g., only one or two components to be present in the function layers is possible if target mixing is used during the deposition.

Because of the smooth and precise surfaces of the function planes according to the invention, very high surface qualities of the preform can be maintained during the pressing process. As the preform, it is preferred to employ preforms having the highest surface quality possible, i.e., having a quality corresponding to that existent in undisturbed glass in the viscous state (i.e., uninjured, virginal glass). Such a high grade surface quality can easily be guaranteed in an embodiment of the invention by using a preform having surfaces sufficient to provide optically suitable planes of the glass article.

Preferably the preform can take the shape of a sphere of different radii manufactured by, e.g., polishing or preforms with areas such as disks, (i.e. a thin flat circular piece of glass) or squared blocks of various diameters and height. The disks and blocks are produced, e.g., by controlled fracture induced by thermal stresses (thermal splitting) or mechanical forces due to three point bending or hydrostatic pressure.

In an embodiment of the invention, it is further preferably provided to carry out the method in a cleanroom or chamber or housing, wherein a concentration of particles in the air less than $10^4/m^3$ is present. It became apparent that in this way the occurrence of micro glass gaps in the surface of the manufactured glass article, not explainable up to now, can be avoided. By $10^4/m^3$ is meant the particle size and number according to VDI/2083, VDI Publishing House, Dusseldorf (1976), Sheet 1, Page 4 (corresponding to U.S. Federal Standard 209).

According to another embodiment of the invention, a total pressure of less than $10^{-2}$ mbar is preferably maintained in the vicinity of the mold (i.e., in the process compartment or in the zone contacting the glass) during the pressing process. By this means, possible chemical interactions between the materials used in the process and gaseous materials are avoided as much as possible. It is particularly effective to maintain a partial pressure of reducing or oxidizing gases, especially oxygen, of less than $10^{-3}$ mbar or preferably even less than $10^{-5}$ mbar in the vicinity of the mold during the pressing process. In this connection, it also has to be noted that reducing gases can interfere, e.g., generating a dark coloration in lead glasses by reducing lead oxide to lead.

According to an especially advantageous embodiment of the invention, a gaseous atmosphere providing a concentration of nitrogen and/or carbon which is able to regenerate the function layer is maintained in the vicinity of the mold (i.e., in the process compartment) during the pressing process. With the comparatively high temperature prevailing during the pressing process, a regeneration and thereby an extended service life of the very thin function layer can be achieved. According to present understanding, but without being bound by same, by virtue of the presence of nitrogen and carbon compounds in the function layer, to which the hardness and the wear resistance can mainly be traced, the function layer can develop vacancies on nitrogen and/or carbon sites which can be filled from the nitrogen molecules in the gas phase under the mentioned conditions. Such a mechanism also seems to be probable because the composition of the nitrogen and/or carbon compounds are not always stoichiometric.

When a monocrystalline basis is employed, it appeared advantageous to arrange the function layer essentially perpendicular to the longest direction of the crystal. A very high mechanical loading capacity is achieved at the same time.

With respect to the control of the temperature, it is advantageous to maintain the temperature of the preform at the beginning of the pressing process at a value at least equal to the transformation temperature of the glass $T_G$ and to adjust the temperature of the function planes to a higher temperature. In this way, the pressing speed can be increased in many cases, especially when a preform having a high viscosity at the beginning is pressed. On the other hand, it is also possible to maintain the temperature of the function plane in the vicinity of the transformation temperature of the glass at the beginning of the pressing process and then insert the preform having a higher temperature. This can be advantageous, especially when pressing is carried out at higher temperatures and comparatively low viscosities, e.g., less than about $10^9$ dPa.s, to achieve a high pressing speed combined with a comparatively rapid cooling.

The described special methods can be particularly applied as well if the preform, when located, according to the known art, in a mold comprising two press dies opposite each other (showing a function plane in each case) is placed onto one of the press dies, generally onto the lower die of a press, being arranged vertically, at the beginning of the pressing process. Accordingly, it is then advantageous to bring the preform together with the mentioned press die to a temperature which is higher than the temperature of the other press die. In particular, the provided difference in temperature according to the invention can be applied in such a way that, if a mold containing two opposite press dies is used, the function planes of the press dies can be preferably maintained with differences in temperature. When unequal deformation of the glass surfaces occurs, the function plane where the higher deformation takes place may be held at a higher temperature than the other function plane. It is advantageous to maintain a difference of temperature until the end of the pressing process in order to facilitate the removal of glass from the function layers.

In an especially advantageous embodiment of the process, the applied differences of temperature are adjusted to the shape of the viscosity curve of the glass to be molded and amount to preferably at least 50° K.

In order to increase the production speed, it is advantageous in an embodiment of the invention, to start the cooling process in the mold during the forming of the glass, preferably during an initial stage of the forming. This can easily be done if a corresponding high initial temperature exists. In this connection, it should be noted that according to the invention it is an advantage of this invention that it is not necessary to work at very low temperatures and corresponding high glass viscosities. On the contrary, all advantages resulting from the use of a comparatively high starting temperature can be obtained, e.g., a glass viscosity of less than about $10^9$ dPa.s.

The removal of the glass article from the mold can take place as soon as the produced glass article has a sufficiently stable form. Preferably, the article is removed from the mold when the temperature of the function layers or in the vicinity of the function planes correspond to a viscosity of the glass of at least $10^{13}$ dPa.s.

The mold according to the invention shows special advantages with regard to surface quality and form stability of the thereby molded glass articles independent of the process of the invention.

BRIEF DESCRIPTION OF THE DRAWING

Various other objects, features and attendant advantages of the present invention will be more fully appreciated as the same becomes better understood when considered in connection with the accompanying drawing, and wherein:

The accompanying FIGURE is a diagrammatic view along the lines of a vertical section showing a mold according to the invention for the performance of the method according to the invention.

DETAILED DESCRIPTION OF THE DRAWING

FIG. 1 shows diagrammatically a mold 1 comprising a lower press die 3 and an upper press die 7 being movable along a vertical axis 5 with regard to the lower press die 3. The dies 3, 7 include thin mold-function-layers 9, 11 which are aligned to each other and which are strongly adhering to bases 13, 15, thereby providing function planes 17, 19 in their outer surfaces which correspond to the surface grade of the optically suitable planes and the shape of the glass article to be manufactured with regard to the thermal expansion. The bases 13, 15 are supported on mounting means 21, 23, being fixed in clearances of the dies 3, 7. In the mounting means 21, 23, controllable heating devices 25, 27 are provided, e.g., electrical heating wires and thermometer probes 29, 31 for detecting the temperatures. In addition, heating devices 33, 35, e.g., electrical heating wires, inductive heating devices or such are provided on the outer surfaces of the press dies 3, 7.

The mounting means 21, 23 consist of thermally resistant material, preferably a heat-conductive material, e.g., metal or ceramic so they can be easily cooled by cooling devices 37, 39, for which in the described embodiment, cooling tubes 41, 43 are provided. The mold 1 is arranged in a casing 45, which can be evacuated or treated or rinsed with any gaseous atmosphere by conduits 47, 49. The casing 45 is arranged in a clean-air housing or room 51 which is accessible by a charging valve 55. A ventilation device 53 with appropriate filters ensures that air free from a desired concentration rate of particle impurities, particularly less than $10^4$ particles/m$^3$, is present.

The molding surfaces 57, 59 of the bases 13, 15, lying under the function layers 9, 11 are formed as exactly as possible and with a surface quality as high as possible with respect to the optically suitable planes of the glass article to be manufactured, e.g., the formation of the molding surfaces being accomplished by conventional grinding or polishing. In order to obtain a high surface quality, the bases 13, 15 are comprised of at least a major amount of structureless material which is amorphous, monocrystalline or polycrystalline having a grain size of less than 0.5 um. The function layers 9, 11 are applied to these molding surfaces 57, 59 forming unstructured thin-layers, e.g., by reactive sputtering and provide a uniform thickness of less than 5 um, e.g., 0.4 um so that the function layers 17, 19 have exactly the shape of the underlying molding surfaces 57, 59, thereby smoothing out remaining microscopically small defects on the molding surfaces 57, 59.

The figure shows that the preform 61 is placed on the function plane 17 of the lower press die 3, said preform having the shape of a plate in the described embodiment and showing the highest surface quality possible at least in those surface areas 63, 65 which are to be formed at the function planes 17, 19. In particular, said surface areas 63, 65 refer to cleavage surfaces, manufactured by thermal splitting.

The bases 13, 15 must be sufficiently strong to transmit high pressing forces. They also are made of materials that can easily be brought to the desired precision and surface quality. The function layers 9, 11 preferably are comprised of a material having at least one component in common with the bases 13, 15. In particular, the following materials are suitable as components of the layers:

Basis:
Si, SiC, $Si_3N_4$, WC, $Al_2O_3$, $SiO_2$
Function layer:
SiC, $Si_3N_4$, TiN, AlN, ZrN.

An especially suitable combination consists of bases 13, 15 being made of silicon and function layers 9, 11 being made of TiN having been applied by reactive sputtering. The mounting means 21, 23 consist of a metal having a low thermal expansion.

Prior to the pressing process, the pressing dies 3, 7 are heated in such a way that the bases 13, 15 and the function layers 9, 11 as well as the preform 61 show the desired starting temperatures. The preform can also be heated outside the mold in order to set up the desired difference in temperature between the preform 61 and the function layers 9, 11 of the mold 1.

It is also important that all parts including the preform 61 are meticulously cleaned.

Prior to heating, the mold 1 is evacuated by the conduits 47, 49, rinsed with nitrogen and then evacuated again. As long as the mold 1 is hot, a total pressure of, e.g., $10^{-3}$ mbar with a partial pressure of oxygen of less than $10^{-5}$ mbar is maintained. As soon as the desired starting temperatures have been reached, pressing can take place. If a stronger forming of the glass has to be obtained on one of the function layers compared to the other, it is advantageous to choose the temperature of the first-mentioned function layer somewhat higher than that of the other, the periods for the forming of the glass on both sides thereby being approximately equal.

After a chosen pressing time within which the forming according to one's experience has safely finished, the formed glass article may be cooled and removed from the mold after sufficient cooling. It became apparent that the pressing process can be expedited by taking advantage of the time delay between the switching of the cooling device and the actual decrease of the temperature of this function plane so as to start the cooling before the termination of the pressing process.

For this purpose, the heating device of the mold 1 is switched off and the cooling devices 37, 39 are started, e.g., by passing an appropriate cooling fluid therethrough. After the formed preform has been cooled to below a temperature corresponding to a viscosity of about $10^{13}$ dPa.s, the mold 1 can be opened to remove the molding which is then finished to form a glass article by annealing.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire texts of all applications, patents and publications, if any, cited above and below, and of corresponding German application P 37 29 281.1 (the priority document), are hereby incorporated by reference.

In the following examples, the descriptions of the figure are indeed applicable to molded articles which do not correspond to the shape of the figure.

EXAMPLES

Example 1: Molding of a Concavo-Convex Lens

The mold 1, comprising a lower press die 3 and an upper press die 7 has bases 13, 15 made of monocrystalline silicon, whereby the surface normals in the center of the mold faces are oriented perpendicular to the 111-crystal-axis of the silicon crystals. The molding surfaces 57, 59 of the bases 13, 15, serving for the application of the function layers 9, 11 are exactly adjusted to the geometry of the desired lenses by mechanical grinding or super-polishing. The surface grade of the molding surfaces 57, 59 is better than the minimum requirement concerning the lenses to be formed and corresponds to the specification $5/2 \times 0.040$ according to DIN 3140. The surface roughness amounts to about 0.4 nm rms. Uniformly, these function layers 9, 11 (thickness of layer about 100 nm) consisting essentially of silicon, titanium and nitrogen have been precipitated on the molding surfaces 57, 59 by radio frequency sputtering in an atmosphere containing argon and nitrogen. The surface roughness of the function planes 17, 19 amounts to about 0.6 nm rms (rms is root mean square which is the square root of the mean of the square of the difference between the values of the population and its mean).

The preform 61 is positioned on the lower press die 3 of the mold 1, the lower press die 3 being 10 mm in diameter and showing a mold face having a spherical concave contour with a radius R = 10 mm. A sphere is used as the preform 61 having a diameter of 6.5 mm and a surface which is brought to optical quality by mechanical polishing. The glass has the following composition (in percentage by weight): 46% $SiO_2$, 45% PbO, 4% $Na_2O$, 4% $K_2O$ and a transformation temperature of 432° C.

In the vicinity of the mold 1 (i.e., in the process compartment, in other words, where the glass is situated), the total pressure is lowered to about $10^{-5}$ mbar by evacuation, the partial pressure of oxygen then amounting to less than $5 \times 10^{-6}$ mbar. The total pressure is increased to about $10^{-3}$ mbar in the vicinity of the mold by addition of pure nitrogen, the partial pressure of oxygen practically remaining unchanged. By means of a high frequency inductive-heating device the upper press die 7 is heated to about 460° C. and the lower press die 3 together with the preform lying thereon is heated to about 520° C. The dies 3, 7 are moved together and the preform 61 is formed into a concavo-convex lens. During the molding process, the pressing force is increased continuously up to about 2 kN and the temperatures of the upper and lower die are lowered to 430° C.

At this temperature, the glass shows a viscosity of about $5.1 \times 10^{12}$ dPa.s. After a pressing time of about 1 min, the pressing force is lowered, the dies are moved apart and the molded lens is removed from the mold. Subsequently, the lens is annealed.

The formed concavo-convex lens has an outer diameter of 11.2 mm and a center thickness of 2.1 mm. The difference between the contour of the lens and the theoretical value of the contour amounts to less than 0.5 rings. The irregularity amounts to less than 0.1 rings. The number and size of the surface defects on the glass surfaces formed are lower than 5/2×0.063 according to DIN 3140. The surface roughness of the lens amounts to about 0.6 nm rms The difference concerning the wave front is smaller than $\lambda/10$.

Example 2: Molding of an Aspherical Lens

The bases 13, 15 of the lower press die 3 and the upper press die 7 of the mold, respectively, are composed of monocrystalline $Al_2O_3$ (synthetic sapphire). The working surfaces 57, 59 are formed exactly with respect to the geometry of the lens to be formed by mechanical grinding or super-polishing. The upper and the lower die, respectively, have an outer diameter of 36 mm and a convex contour of the function planes 17, 19, whereby the contour of the working surface 57 of the lower die 3 is formed aspherically. The size and number of the surface defects on the polished working surfaces 57, 59 satisfy the specification 5/2×0.040 according to DIN 3140. The surface roughness amounts to less than 0.6 nm rms. A function layer 17 and 19, respectively, consisting of aluminum, titanium, zirconium and nitrogen and having a thickness of 300 nm each is applied to the working surfaces 57, 59 of the sapphire-bases 13, 15 by reactive cathode sputtering. The surface roughness of the so generated function layers 17, 19 amounts to less than 0.5 nm rms.

A glass in the shape of a rectangular box (a right parallelepiped, 35×35×12 mm) is used as the preform 61 whose upper and lower sides, being formed into the optically suitable planes of the lens, were produced by thermal splitting. In this case, a glass is used having the following composition (in percentage by weight): 42% $La_2O_3$, 35% $B_2O_3$, 4% $SiO_2$, 3% CaO, 8% ZnO, 7% $ZrO_2$, 1% $TiO_2$, the transformation temperature of this glass being 611° C.

The preform is heated within a casing 45 but outside the mold to about 645° C., whereby in said casing the same atmosphere of the surroundings as in Example 1 is employed. The upper die 7 as well as the lower die 3 are heated by separate resistance heating elements to about 702° C. and 689° C., respectively. The preform 61 is put into the mold 1 and is shaped by a slowly increasing pressing, wherein the preform is supported at its outer surface during the whole transforming process. The temperatures of the upper and lower die are regulated in a downward direction to 609° C. even before the maximum pressing force of 5 kN, being held for about 2 min, is attained. Subsequently, the pressing force is lowered slowly within about 2 min to zero, the press dies are moved apart and the molded double concave lens is removed from the mold. The lens is then annealed outside the process compartment. The optically suitable plane of the lens has a diameter of 33 mm and a center thickness of 9.2 mm. The contour precision of the formed lens lies within 0.5 rings compared to the theoretical value of the contour having a regular tolerance of less than 0.1 rings. The surface roughness of the molded glass surfaces amounts to about 0.5 nm rms.

In general, the annealing of the lenses is conventional, for example, the lens is heated to about 605° C. and held for ten minutes and thereupon cooled slowly by 7° K./min to room temperature.

As contrasted to lenses that are not suitable for image-forming purposes, the process of the present invention can produce lenses having the following minimum properties for image-forming purposes.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions. For example, various aspects of the invention have independent uses. The mold itself can be employed in other processes. The use of clean and/or other environmental conditions air will be useful in other processes. The non-isothermal conditions themselves lead to a distinct improvement even without other process limitations. The process without an annealing step is also a useful subcombination inasmuch as purchasers of the lenses may conduct the annealing, if so desired.

What is claimed is:

1. A mold for manufacturing a glass article comprising function planes of hard, wear-resistant layers which have a shape and surface quality suitable for the generation of an optically effective plane, wherein said mold comprises at least one function layer comprising a mechanically unwrought structureless thin layer having a thickness of less than 5 um and a peak-to-valley height of less than 0.1 um, said function layer being adhered to a stable basis, wherein said stable basis comprises an amorphous, monocrystalline or polycrystalline material with a grain size of less than 0.5 um, with the proviso that said basis is not polycrystalline WC.

2. A mold according to claim 1, wherein said basis is made of an amorphous, monocrystalline or polycrystalline material with a grain size of less than 0.5 microns and said material comprises at least one of the elements Ti, Zr, Hf, V, Nb, Ta, Cr, Mo, W. Al, Si, Ge and C, said basis comprising a molding surface conforming to the shape of a glass article to be produced, said molding surface having been finished to a grade higher than the minimum requirement concerning the optical surfaces of the glass article to be produced, said function layer having been deposited on said molding surface of said stable basis to a thickness of less than 5 microns and having been left in its unwrought state, said function layer comprising at least one of said elements of said basis and a compound containing carbon, nitrogen or carbon and nitrogen.

3. A mold according to claim 2, wherein the material of said basis comprises at least one of the elements Ti, Zr, Hf, V, Nb, Ta, Cr, Mo, W. Al, Si, Ge and C, which is present as a compound with nitrogen or oxygen.

4. A mold for manufacturing a glass article comprising function planes of hard, wear-resistant layers which have a shape and surface quality suitable for the generation of an optically effective plane, wherein said mold comprises at least one function layer comprising a mechanically unwrought structureless thin layer having a thickness of less than 5 um and a peak-to-valley height of less than 0.1 um, said function layer being adhered to a stable basis, wherein said stable basis comprises an amorphous, monocrystalline or polycrystalline material with a grain size of less than 0.5 um
with the proviso that said basis is not WC.

5. A mold for manufacturing a glass article comprising function planes of hard, wear-resistant layers which have a shape and surface quality suitable for the generation of an optically effective plane, wherein said mold comprises at least one function layer comprising a mechanically unwrought structureless thin layer having a thickness of less than 5 um and a peak-to-valley height of less than 0.1 um, said function layer being adhered to a stable basis, wherein said stable basis comprises an amorphous or monocrystalline material with a grain size of less than 0.5 um.

6. A mold according to claim 2, wherein the composition of the function layer is AlN, $Si_3N_4$, SiC, TiN, or ZrN.

7. A mold according to claim 2, wherein the composition of said basis is $Si_3N_4$, $SiO_2$, $Al_2O_3$, $ZrO_2$ or SiC.

8. A mold according to claim 1, wherein the thickness of said mechanically unwrought structureless thin layer is 0.2–0.8 $\mu$m.

9. A mold according to claim 2, wherein the thickness of said mechanically unwrought structureless thin layer is 0.2–0.8 $\mu$m.

10. A mold according to claim 1, wherein said basis is amorphous.

11. A mold according to claim 1, wherein said basis is monocrystalline.

12. A mold according to claim 2, wherein said function layer is AlN and said basis is $Si_3N_4$.

13. A mold according to claim 2, wherein said function layer is AlN and said basis is Si.

14. A mold according to claim 2, wherein said function layer is $Si_3N_4$ and said basis is $SiO_2$.

15. A mold according to claim 4, wherein said basis is made of an amorphous, monocrystalline or polycrystalline material with a grain size of less than 0.5 microns and said material comprises at least one of the elements Ti, Zr, Hf, V, Nb, Ta, Cr, Mo, W, Al, Si, Ge and C, said basis comprising a molding surface conforming to the shape of a glass article to be produced, said molding surface having been finished to a grade higher than the minimum requirement concerning the optical surfaces of the glass article to be produced, said function layer having been deposited on said molding surface of said stable basis to a thickness of less than 5 microns and having been left in its unwrought state, said function layer comprising at least one of said elements of said basis and a compound containing carbon, nitrogen or carbon and nitrogen.

16. A mold according to claim 15, wherein the composition of the function layer is AlN, $Si_3N_4$, SiC, TiN, or ZrN.

17. A mold according to claim 15, wherein the composition of said basis is $Si_3N_4$, Si, $SiO_2$, $Al_2O_3$, $ZrO_2$ or SiC.

18. A mold according to claim 4, wherein the thickness of said mechanically unwrought structureless thin layer is 0.2–0.8 $\mu$m.

19. A mold according to claim 15, wherein the material of said basis comprises at least one of the elements Ti, Zr, Hf, V, Nb, Ta, Cr, Mo, W, Al, Si, Ge and C, which is present as a compound with nitrogen or oxygen.

20. A mold according to claim 5, wherein said basis is made of an amorphous or monocrystalline material with a grain size of less than 0.5 microns and said material comprises at least one of the elements Ti, Zr, Hf, V, Nb, Ta, Cr, Mo, W, Al, Si, Ge and C, said basis comprising a molding surface conforming to the shape of a glass article to be produced, said molding surface having been finished to a grade higher than the minimum requirement concerning the optical surfaces of the glass article to be produced, said function layer having been deposited on said molding surface of said stable basis to a thickness of less than 5 microns and having been left in its unwrought state, said function layer comprising at least one of said elements of said basis and a compound containing carbon, nitrogen or carbon and nitrogen.

21. A mold according to claim 20, wherein the composition of the function layer is AlN, $Si_3N_4$, SiC, TiN, or ZrN.

22. A mold according to claim 20, wherein the composition of said basis is $Si_3N_4$, Si, $SiO_2$, $Al_2O_3$, $ZrO_2$ or SiC.

23. A mold according to claim 5, wherein the thickness of said mechanically unwrought structureless thin layer is 0.2–0.8 $\mu$m.

24. A mold according to claim 20, wherein the material of said basis comprises at least one of the elements Ti, Zr, Hf, V, Nb, Ta, Cr, Mo, W, Al, Si, Ge and C, which is present as a compound with nitrogen or oxygen.

* * * * *